United States Patent
Hanya et al.

(10) Patent No.: US 8,335,055 B2
(45) Date of Patent: Dec. 18, 2012

(54) HEAD SUSPENSION INCLUDING A PIEZOELECTRIC ELEMENT ADHESIVELY MOUNTED WITHIN AN OPENING OF AN ACTUATOR BASE

(75) Inventors: Masao Hanya, Aikoh-gun (JP); Toshiki Ando, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 269 days.

(21) Appl. No.: 12/750,327

(22) Filed: Mar. 30, 2010

(65) Prior Publication Data

US 2010/0290158 A1  Nov. 18, 2010

(30) Foreign Application Priority Data

May 15, 2009 (JP) ................ P2009-118297

(51) Int. Cl.
G11B 5/58 (2006.01)
G11B 21/24 (2006.01)

(52) U.S. Cl. .................................... 360/294.4
(58) Field of Classification Search ............. 360/294.4
See application file for complete search history.

(56) References Cited

U.S. PATENT DOCUMENTS

| 6,661,619 | B2 * | 12/2003 | Nishida et al. ............ 360/294.4 |
| 7,177,119 | B1 * | 2/2007 | Bennin et al. ............. 360/294.6 |
| 7,872,834 | B1 * | 1/2011 | Pokornowski et al. .... 360/294.4 |
| 8,085,508 | B2 * | 12/2011 | Hatch ....................... 360/294.4 |
| 2002/0089793 | A1 * | 7/2002 | Nakagawa et al. ........ 360/294.4 |
| 2002/0118492 | A1 * | 8/2002 | Watanabe et al. ......... 360/294.4 |
| 2003/0142448 | A1 * | 7/2003 | Koganezawa ............. 360/294.4 |
| 2005/0248887 | A1 * | 11/2005 | Shimizu et al. ........... 360/294.4 |
| 2009/0080117 | A1 * | 3/2009 | Shimizu et al. ........... 360/294.4 |
| 2009/0244786 | A1 * | 10/2009 | Hatch ....................... 360/294.4 |
| 2010/0073825 | A1 * | 3/2010 | Okawara .................. 360/294.4 |
| 2010/0302687 | A1 * | 12/2010 | Soga et al. ................ 360/294.4 |

FOREIGN PATENT DOCUMENTS

| JP | 2001-307442 | 11/2001 |
| JP | 2002-050140 | 2/2002 |
| JP | 2009-080915 | 4/2009 |

* cited by examiner

Primary Examiner — Jefferson Evans
(74) Attorney, Agent, or Firm — Jordan and Hamburg LLP

(57) ABSTRACT

A head suspension has a load beam and a piezoelectric actuator, the actuator base being connected to the base part of the load beam and having at least an opening. A nonconductive adhesive applied at least between the circumferential edge of the opening and a circumferential side face of the piezoelectric element and between a bottom receiver and the bottom face of the piezoelectric element is configured to adhere the piezoelectric element to the opening.

10 Claims, 11 Drawing Sheets

Fig.5A Vertical stiffness
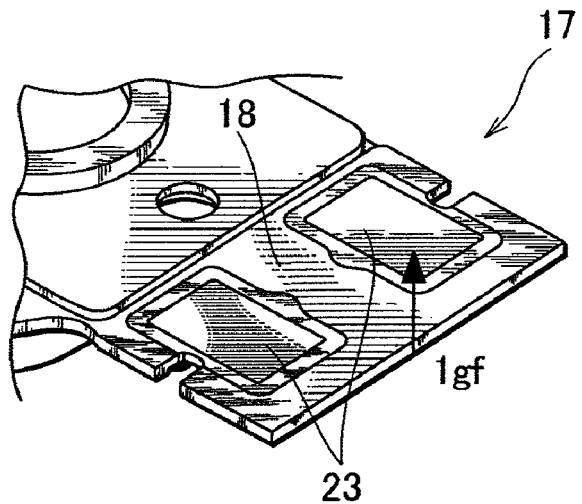
Fig.5B Torsion stiffness
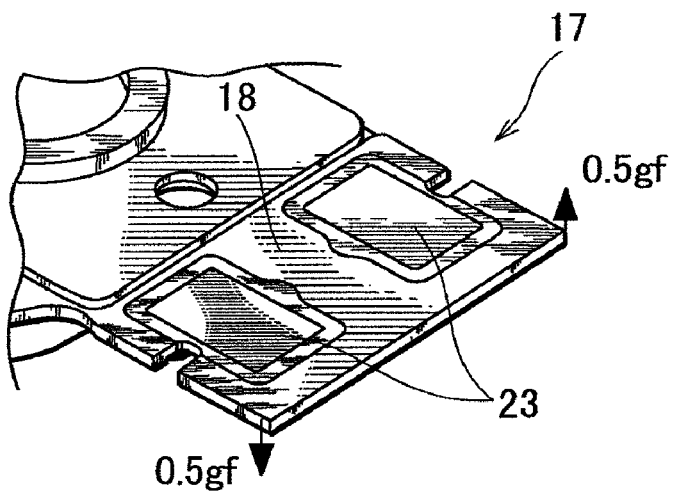
Fig.5C Sway stiffness
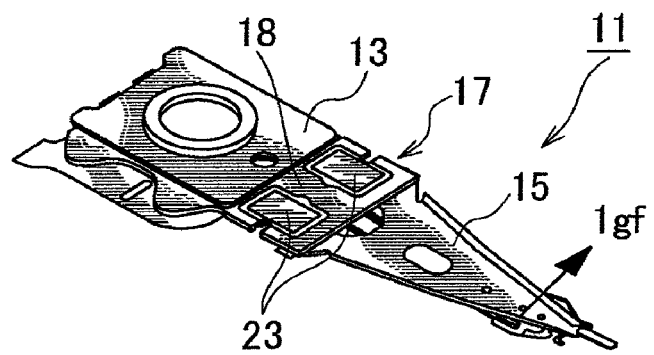

Fig.6

| | Comparative example | First embodiment |
|---|---|---|
| Vertical Stiffness [N/m] | 9,467 | 10,850 |
| Torsion Stiffness [μNm/deg] | 942 | 1,243 |
| Sway Stiffness [N/m] | 37,560 | 47,342 |

US 8,335,055 B2

HEAD SUSPENSION INCLUDING A PIEZOELECTRIC ELEMENT ADHESIVELY MOUNTED WITHIN AN OPENING OF AN ACTUATOR BASE

BACKGROUND OF THE INVENTION

1. Field of the Invention

The present invention relates to a head suspension for a disk drive incorporated in an information processing apparatus such as a personal computer, and particularly, to a head suspension having a piezoelectric element that is attached with a nonconductive adhesive and deforms in response to a voltage applied thereto.

2. Description of Related Art

Small-sized, precision information devices are rapidly advancing, and for use with such devices, needs for micro-actuators capable of conducting positioning control for very small distances are increasing. Such micro-actuators are highly needed by, for example, optical systems for correcting focuses and inclination angles, ink jet printers for controlling ink heads, and magnetic disk drives for controlling magnetic heads.

The magnetic disk drives are strongly needed to increase their storage capacities. Increasing the storage capacity of a magnetic disk drive is generally achievable by increasing the storage capacity of each magnetic disk contained in the magnetic disk drive. The storage capacity or recording density of a magnetic disk will increase, without changing the diameter thereof, if the number of tracks per inch (TPI) on the magnetic disk is increased, i.e., if the width of a track is narrowed. For this, a magnetic head of a head suspension installed in the magnetic disk drive must conduct a precise positioning operation in a direction across the tracks, i.e., a sway direction. For realizing the precise positioning operation, an actuator capable of accurately moving and positioning the magnetic head in a very small area is needed.

To meet the need, the applicant of the present invention has proposed in Japanese Unexamined Patent Application Publication No. 2002-050140 a head suspension for a disk drive, including a base plate, a connection plate having a hinge thinner than the base plate, a load beam provided with a flexure, and a piezoelectric actuator having a pair of piezoelectric elements.

This related art employs a dual actuator system that involves, for a precise positioning purpose, a voice coil motor and the piezoelectric actuator having two piezoelectric elements made of, for example, PZT (lead zirconate titanate).

The piezoelectric actuator in the dual actuator system minutely moves a front end of the load beam in a widthwise direction (sway direction) of the head suspension. Compared with a single actuator system employing only the voice coil motor, the dual actuator system employing the voice coil motor and piezoelectric actuator is capable of more precisely positioning a magnetic head attached to a front end of the head suspension.

An important issue for the head suspension employing the dual actuator system is to secure originally required vibration and impact characteristics when attaching the piezoelectric elements to the head suspension.

One approach to address the issue is disclosed in Japanese Unexamined Patent Application Publications No. 2002-050140 and No. 2001-307442. According to these related arts, a base plate of a head suspension is provided with an opening for receiving a piezoelectric element and a pair of flexible links each having a U-shape and outwardly protruding from the opening. The piezoelectric element received in the opening is attached to the base plate with a nonconductive adhesive filled in a space between the piezoelectric element and the base plate.

According to the related arts, the pair of flexible links increases stiffness and sufficiently secures originally required vibration and impact characteristics.

The pair of outwardly protruding flexible links of the related arts, however, decreases a displacement stroke of the actuator, although the pair improves stiffness.

SUMMARY OF THE INVENTION

An object of the present invention is to provide a head suspension capable of securing basic characteristics such as vibration and impact characteristics without deteriorating a displacement stroke of an actuator.

In order to accomplish the object, an aspect of the present invention provides a head suspension having a load beam and a piezoelectric actuator, the piezoelectric actuator supporting a base part of the load beam and configured to displace a front end of the load beam in a sway direction. The piezoelectric actuator has an actuator base and at least a piezoelectric element, the actuator base connected to the base part of the load beam and having at least an opening, the piezoelectric element attached to the opening and deforming in response to a voltage applied thereto to conduct displacement of the front end of the load beam. The head suspension includes a circumferential side face of the piezoelectric element, a circumferential edge of the opening, configured to define the opening in the actuator base and surround and face the circumferential side face of the piezoelectric element, a bottom receiver formed at the opening, configured to face the periphery of a bottom face of the piezoelectric element, a clearance splitting the circumferential edge of the opening and the bottom receiver, configured to allow the piezoelectric element to deform, and a nonconductive adhesive applied at least between the circumferential edge of the opening and the circumferential side face of the piezoelectric element and between the bottom receiver and the bottom face of the piezoelectric element, configured to adhere the piezoelectric element to the opening.

The head suspension according to this aspect of the present invention satisfactorily demonstrates basic characteristics such as vibration and impact characteristics while securing a sufficient displacement stroke of the piezoelectric actuator.

BRIEF DESCRIPTION OF THE DRAWINGS

FIGS. 5A, 5B, and 5C illustrate directions and sizes of load applied in three tests of evaluating the stiffness of the piezoelectric actuator of the first embodiment, in which FIG. 5(A) is a vertical stiffness test, FIG. 5(B) is a torsional stiffness test, and FIG. 5(C) is a sway stiffness test;

FIG. 6 is a table illustrating results of the tests conducted on the comparative example and first embodiment;

DETAILED DESCRIPTION OF EMBODIMENTS

Head suspensions according to embodiments of the present invention will be explained in detail with reference to the drawings.

Figure 1:
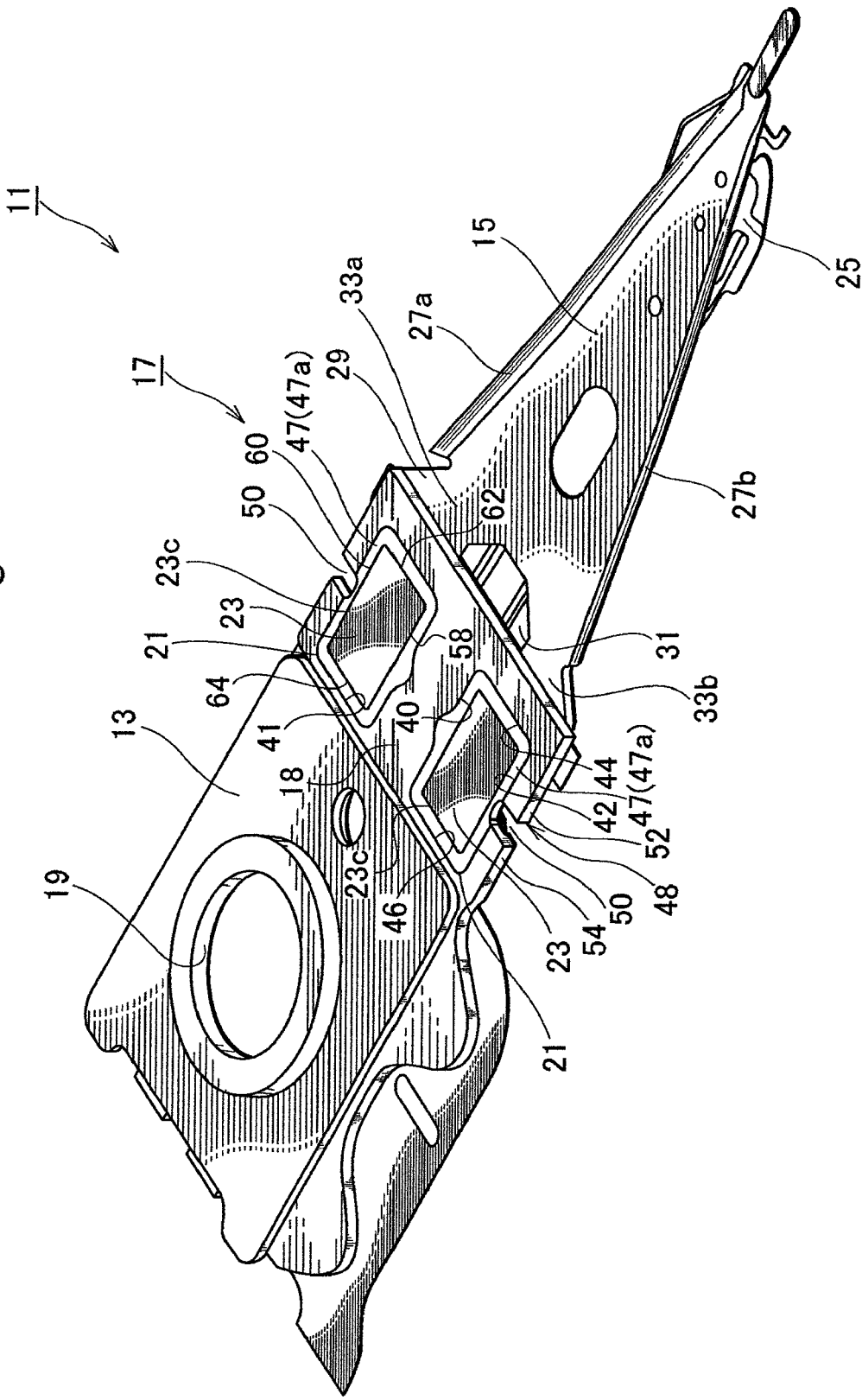
FIG. 1 is a perspective view illustrating a head suspension according to a first embodiment of the present invention.

FIG. 1 is a perspective view illustrating the head suspension 11 according to the first embodiment of the present invention. In FIG. 1, the head suspension 11 has a base plate 13, a load beam 15, and a piezoelectric actuator 17.

The base plate 13 is a metal thin plate made of, for example, stainless steel and has a thickness of about 150 to 200 μm. The base plate 13 may be made of light metal such as aluminum alloy or a clad material consisting of light metal and stainless steel. The light metal can reduce the inertia of the base plate 13, increase the resonant frequency of the head suspension 11 in a sway direction, i.e., a widthwise direction of the head suspension 11, and improve the tracing performance of the head suspension 11.

The base plate 13 has a circular boss 19. With the boss 19, the base plate 13 is attached to a front end of an actuator arm (not illustrated) and is turned by a voice coil motor (not illustrated). The base plate 13 has a front end in the vicinity of the load beam 15 and a rear end opposite to the front end. The front end of the base plate 13 is connected through the piezoelectric actuator 17 to the load beam 15. The details of the piezoelectric actuator 17 will be explained later.

The load beam 15 is to apply load onto a slider (not illustrated). The load beam 15 is a resilient metal thin plate made of, for example, stainless steel and has a thickness of about 30 to 150 μm. Like the base plate 13, the load beam 15 may be made of light metal such as aluminum alloy or a clad material consisting of light metal and stainless steel.

The load beam 15 has a flexure 25 whose front end supports the slider that has a magnetic head. The load beam 15 has bent edges 27a and 27b extending across the sway direction, to reinforce the stiffness of the load beam 15.

A rear end of the load beam 15 is integral with a connection plate 29. The connection plate 29 is a resilient metal thin plate made of, for example, stainless steel and has a thickness of about 30 μm. The connection plate 29 has a hole 31. The hole 31 reduces the thickness-wise bending stiffness and weight of the connection plate 29. On each side of the hole 31, the connection plate 29 has hinges 33a and 33b that are bendable in a thickness direction. A rear end of the connection plate 29, i.e., a base part of the load beam 15 is attached to a front end of the piezoelectric actuator 17.

The piezoelectric actuator 17 that is an essential part of the head suspension 11 according to the embodiment 1 will be explained with reference to FIGS. 2 and 3.

Figure 2:
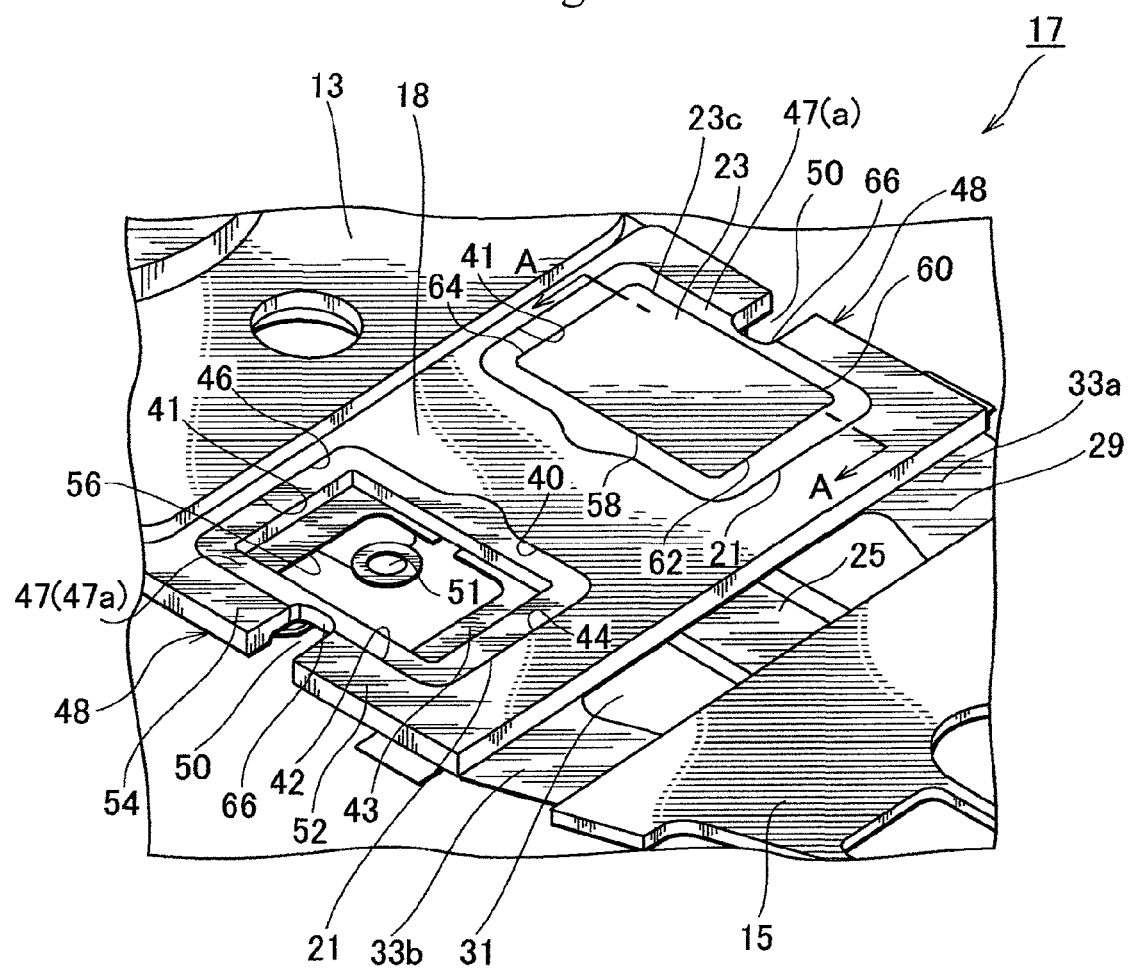
FIG. 2 is an enlarged perspective view illustrating a piezoelectric actuator of the head suspension illustrated in FIG. 1.
Figure 3:
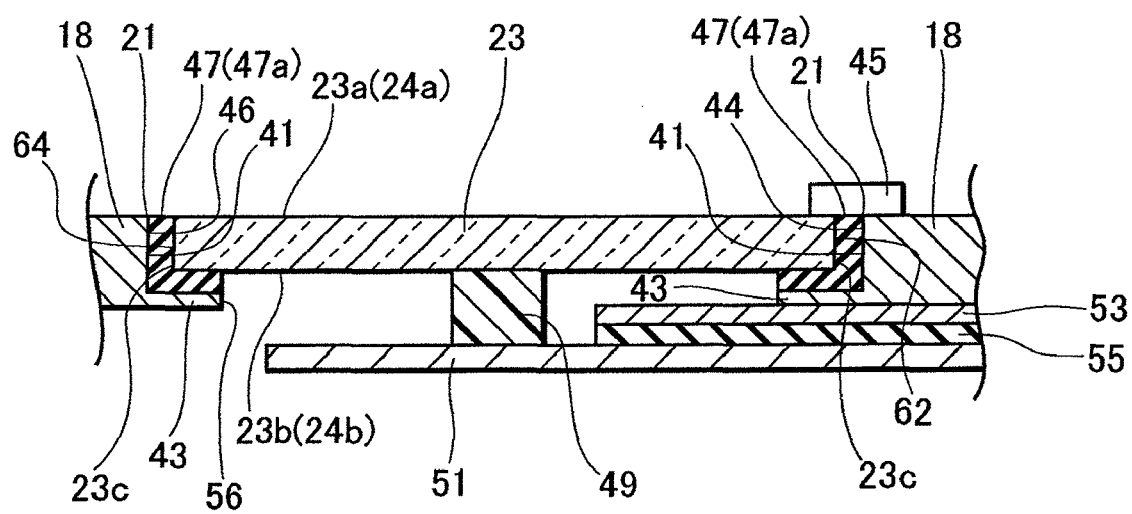
FIG. 3 is a sectional view taken along a line A-A of FIG. 2.

FIG. 2 is an enlarged perspective view illustrating the piezoelectric actuator 17 and FIG. 3 is a sectional view taken along a line A-A of FIG. 2. In FIG. 2, one of two piezoelectric elements 23 is removed to clearly show a back side structure of the piezoelectric actuator 17.

Before explaining the details of the piezoelectric actuator 17, problems of the head suspension according to the related art will be explained. As explained above, the head suspension according to the related art has a pair of flexible links each having a U-shape and outwardly protruding from an opening of the head suspension. Due to the presence of the protruding U-shaped links, the related art has the below-mentioned problems (1) to (7).

(1) The U-shaped links may reduce an in-plane stiffness relative to a vertical stiffness. They, however, also reduce a displacement stroke of the actuator of the head suspension.

(2) The U-shaped links increase widthwise dimensions of the head suspension, to reduce the number of parts producible from a material and decrease the number of products manufacturable from materials.

(3) The U-shaped links increase widthwise dimensions of the head suspension, to cause physical interference with tools, works, and the like on an existing manufacturing line. To avoid such interference, a new manufacturing line must be set up to produce head suspensions with the U-shaped links. This leads to increase an areal allocation for the manufacturing line, facility investment, and manufacturing costs.

(4) The flexible U-shaped links will be caught and deformed when, for example, removing burrs from a press-shaped head suspension by barreling.

(5) To avoid such trouble, chemical polishing instead of the barreling may be employed to remove burrs. This leads to increase the cost of the head suspension.

(6) When designing a magnetic disk drive in which the head suspension with the U-shaped links is installed, a consideration must be made to avoid interference between the U-shaped links and peripheral parts. This leads to decrease the degree of freedom in designing an arrangement of parts around the head suspension.

(7) The flexible U-shaped links cause specific flattering and torsional vibration on the head suspension. These vibration modes will not occur on head suspensions having no flexible U-shaped links. Namely, the head suspension with the U-shaped links increases the number of frequency parameters to consider and makes it difficult to design a head suspension with optimum vibration characteristics.

Further, when designing the piezoelectric actuator 17, considerations must be made to effectively transfer a distortion (displacement) of the piezoelectric element 23 to the load beam 15, secure electric insulation between an electrode of the piezoelectric element 23 and the actuator base 18, prevent dust from dropping off a circumferential side face of the piezoelectric element 23, and protect the brittle piezoelectric element 23 from being damaged.

In consideration of these points, the piezoelectric actuator 17 of the first embodiment is made.

As shown in FIGS. 1-3, the piezoelectric actuator 17 is an essential part of the present invention and functions to support a base part of the load beam 15 and move a front end of the load beam 15 in a sway direction (a widthwise direction of the load beam 15). The piezoelectric actuator 17 includes the actuator base 18 and piezoelectric elements 23.

The actuator base 18 is a metal thin plate made of, for example, stainless steel, is interposed between the base plate 13 and the load beam 15, and is discrete from the base plate 13 and load beam 15. A front end of the actuator base 18 is in the vicinity of the load beam 15 and a rear end thereof is in the vicinity of the base plate 13.

A bottom face of the front end of the actuator base 18 is laid on the rear end of the connection plate 29, i.e., the base part of the load beam 15 and is fixed thereto by, for example, laser welding. The rear end of the actuator base 18 is laid on the front end of the base plate 13 and is fixed thereto by, for example, laser welding.

The actuator base 18 may be integral with the base plate 13. In this case, pressing, for example, is employed to punch the integrated base plate 13 and actuator base 18 out of a metal thin plate made of, for example, stainless steel.

The integrated base plate 13 and actuator base 18 is also referred to as "actuator base". Namely, according to the present invention, the "actuator base" can represent both the base plate 13 and actuator base 18.

The actuator base 18 has openings 21 each receiving the piezoelectric element 23. The openings 21 each have a rectangular shape elongated in a longitudinal direction of the head suspension 11 and are arranged side by side in a widthwise direction of the actuator base 18. Each opening 21 is defined with a circumferential edge 41. The circumferential edge 41 includes an inner edge 40, an outer edge 42, a front edge 44, and a rear edge 46. The outer edge 42 of the opening 21 is formed by a wall 48.

The wall 48 extends in the longitudinal direction of the head suspension 11 and is integral with the actuator base 18. Nearly at a longitudinal center of the wall 48, there is formed a clearance 50 that splits the wall 48 into a front wall 52 and a rear wall 54.

The clearance 50 extends between inner and outer edges of the wall 48, i.e., between the periphery of the actuator base 18 and the outer edge 42 of the opening 21. The clearance 50 splits the actuator base 18 on an outer side of the opening 21. Namely, the clearance 50 splits the circumferential edge 41 and a bottom receiver 43 to be explained later on the outer side of the opening 21, to enable the load beam 15 to displace in a sway direction.

The front wall 52 and rear wall 54 of the wall 48 are close to each other, so that a dimension in width direction of the clearance 50 is larger than that in longitudinal direction. This configuration of the clearance 50 allows a nonconductive adhesive part 47a to be present between the clearance 50 and a circumferential side surface 23c of the piezoelectric element 23.

The opening 21 is provided with the bottom receiver 43 having a flange shape. The bottom receiver 43 is integral with a lower end of the circumferential edge 41 of the opening 21 and inwardly protrudes from the circumferential edge 41. The bottom receiver 43 is formed by partly thinning the actuator base 18 by, for example, half-etching technique.

The bottom receiver 43 has a communication hole 56 that connects the opening 21 to a bottom face side of the actuator base 18.

The two openings 21 receive the two piezoelectric elements 23, respectively. The pair of piezoelectric elements 23 deforms in response to a voltage applied thereto. The piezoelectric elements 23 have the same configuration, shape, and size.

Each piezoelectric element 23 has a thickness of about 0.07 mm to 0.20 mm and is made of piezoelectric ceramics such as PZT (piezoelectric zirconate titanate). The piezoelectric element 23 has a rectangular shape whose outer dimensions are slightly smaller than inner dimensions of the opening 21. The piezoelectric element 23 has the circumferential side surface 23c that faces the circumferential edge 41 of the opening 21 in a direction along the surface of the actuator base 18. Namely, the circumferential edge 41 opposes the circumferential side surface 23c of the piezoelectric element 23.

The circumferential side surface 23c includes inner and outer side faces 58 and 60 that oppose the inner and outer edges 40 and 42 of the opening 21 and front and rear side faces 62 and 64 that oppose the front and rear edges 44 and 46 of the opening 21. The circumferential edge 41 of the opening 21 substantially entirely faces the circumferential side surface 23c of the piezoelectric element 23.

The piezoelectric element 23 has a top surface 23a that is substantially flush with a top face of the actuator base 18. The piezoelectric element 23 also has a bottom surface 23b whose periphery opposes the bottom receiver 43 of the opening 21 in a thickness direction. Namely, the bottom receiver 43 of the opening 21 opposes the periphery of the bottom surface 23b of the piezoelectric element 23c. An inner side of the bottom surface 23b of the piezoelectric element 23 faces the outside of the bottom face of the actuator base 18 through the communication hole 56 of the bottom receiver 43.

The top surface 23a and bottom surface 23b of the piezoelectric element 23 each are provided with an electrode 24. The electrode 24 is made of a material having a low contact resistance and a good conductivity, such as gold (Au) and is formed by, for example, vapor deposition, spattering, or plating.

In FIG. 3, the electrode 24a on the top surface 23a of the piezoelectric element 23 is grounded to the actuator base 18 through conductive resin 45 such as silver paste.

The electrode 24b on the bottom surface 23b of the piezoelectric element 23 is connected through a conductive adhesive 49 to wiring 51 made of, for example, copper formed on the flexure 25. The flexure 25 includes a metal base 53, an electric insulating layer 55 formed on the metal base 53, and the wiring 51 formed on the insulating layer 55. Connection between the electrode 24b on the bottom surface 23b of the piezoelectric element 23 and the wiring 51 of the flexure 25 may be achieved by, instead of the conductive adhesive 49, bonding wire, soldering, or ultrasonic bonding.

When the piezoelectric element 23 is set at a predetermined position in the opening 21, the circumferential side surface 23c of the piezoelectric element 23 forms a predetermined gap with respect to the circumferential edge 41 of the opening 21. Also, the bottom surface 23b of the piezoelectric element 23 forms a predetermined gap with respect to the bottom receiver 43 of the opening 23. Into the gaps, the nonconductive adhesive 47 is applied to form the nonconductive adhesive part 47a. The nonconductive adhesive 47 may be any known nonconductive adhesive, or any conductive adhesive containing insulating material such as silica particles or glass particles.

The nonconductive adhesive part 47a is formed between the circumferential side surface 23c and bottom surface 23b of the piezoelectric element 23 and the circumferential edge 41 and bottom receiver 43 of the opening 21. Namely, the adhesive part 47a fills the gaps between the piezoelectric element 23 and the opening 21 and joins the piezoelectric element 23 and opening 21 together, to effectively transfer a distortion (displacement) of the piezoelectric element 23 to the load beam 15.

The nonconductive adhesive part 47a is also formed between the circumferential side surface 23c of the piezoelectric element 23 and the clearance 50. Namely, the adhesive part 47a is entirely formed along the circumferential side surface 23c of the piezoelectric element 23. The part of the adhesive part 47a corresponding to the clearance 50 is thinner than the remaining part thereof, to form a recess 66.

The nonconductive adhesive part 47a is formed by applying the nonconductive adhesive 47 between the opening 21 including the clearance 50 and the piezoelectric element 23 and by solidifying the adhesive 47. When the adhesive 47 is applied, the bottom receiver 43 of the opening 21 prevents the adhesive 47 from leaking out of the bottom surface 23b of the piezoelectric element 23. Between the piezoelectric element 23 and the clearance 50, the front wall 52 and rear wall 54 of the wall 48 are close to each other to surely hold the adhesive 47.

When setting the piezoelectric element 23 in the opening 21, it is preferable to align a center axis of the actuator base 18 in a thickness direction with a center axis of the piezoelectric element 23 in the thickness direction. This prevents a torsional motion of the piezoelectric actuator 17 during a sway operation.

Operation of the piezoelectric actuator 17 with the above-mentioned configuration will be explained.

The piezoelectric actuator 17 displaces a front end of the load beam 15 in a sway direction according to deformation of the pair of piezoelectric elements 23 that occurs when a voltage is applied thereto. When applied a voltage, the pair of piezoelectric elements 23 deforms into a trapezoid with one lateral side thereof in a sway direction longitudinally extending and the other lateral side thereof in a sway direction longitudinally contracting.

According to the directions and strokes of the extension and contraction of the piezoelectric elements 23, the piezoelectric actuator 17 deforms to move the front end of the load beam 15 in a sway direction, i.e., a widthwise direction of the head suspension 11 for a very small distance.

During the sway operation, the clearance 50 on the outer side of the opening 21 allows the piezoelectric element 23 to deform, thereby securing a displacement stroke and smoothly and correctly carrying out the sway operation.

According to the first embodiment, the circumferential side surface 23c of the piezoelectric element 23 is substantially entirely surrounded by the circumferential edge 41 of the opening 21. The gap between the circumferential side surface 23c and the circumferential edge 41 is filled with the nonconductive adhesive part 47a.

With this, the piezoelectric actuator 17 effectively transmits a distortion (displacement) of the piezoelectric element 23 through the nonconductive adhesive part 47a and actuator base 18 to the load beam 15, thereby smoothly and correctly moving the front end of the load beam 15 in a sway direction.

In the piezoelectric actuator 17, the piezoelectric element 23 is circumferentially joined with the opening 21, to improve stiffness. According to the first embodiment, the nonconductive adhesive part 47a is formed even at the clearance 50, to secure the stiffness of the piezoelectric actuator 17.

According to the first embodiment, the bottom receiver 43 inwardly protrudes from the circumferential edge 41 of the opening 21 and faces the periphery of the bottom surface 23b of the piezoelectric element 23. The gap between the bottom receiver 43 and the bottom surface 23b of the piezoelectric element 23 is filled with the nonconductive adhesive 47 that forms the nonconductive adhesive part 47a.

Accordingly, the bottom surface 23b of the piezoelectric element 23 is surely fixed to the bottom receiver 43 and is thereby supported from below.

Stiffness evaluation tests are carried out on the piezoelectric actuator 17 of the head suspension 11 of the first embodiment and on a piezoelectric actuator of a comparative example.

Figure 4:
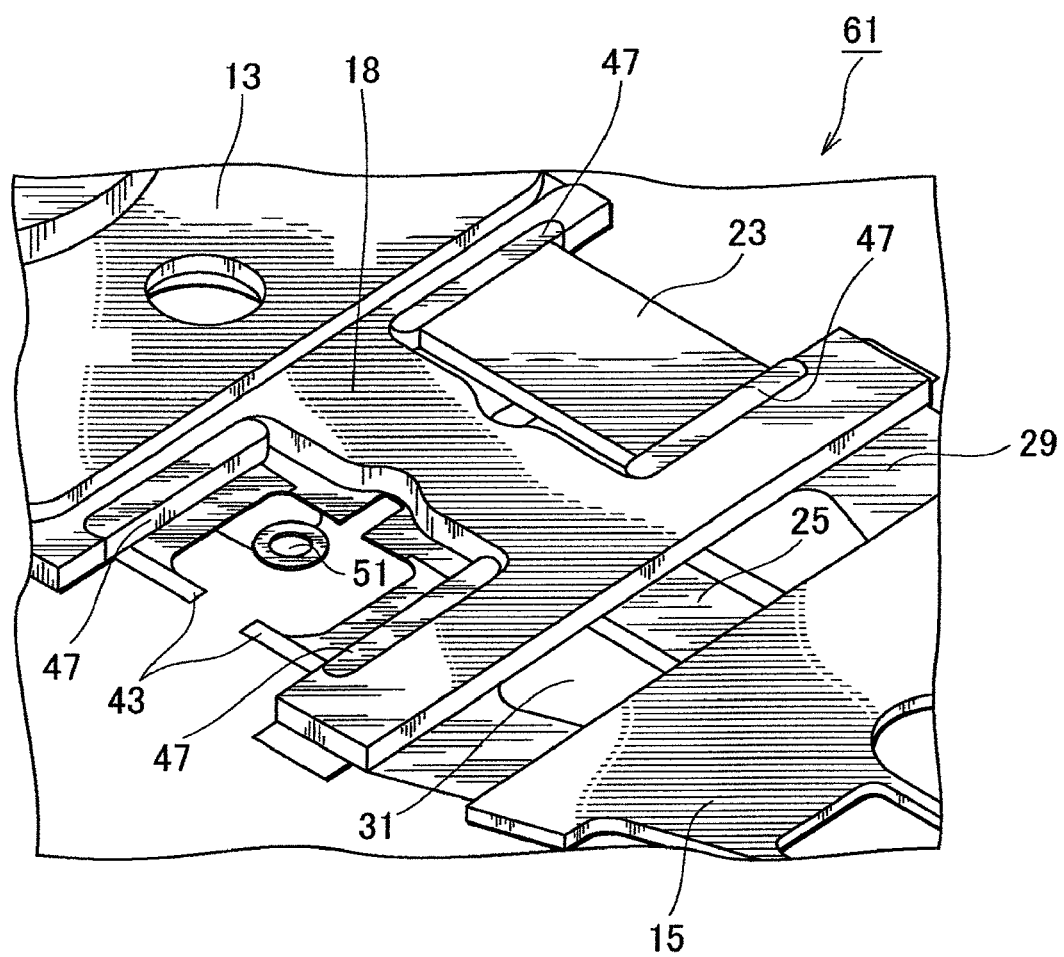
FIG. 4 is an enlarged perspective view illustrating a piezoelectric actuator of a head suspension according to a comparative example.

FIG. 4 is an enlarged perspective view illustrating the piezoelectric actuator of a head suspension according to the comparative example.

The piezoelectric actuator 61 of the comparative example illustrated in FIG. 4 is configured like that of the first embodiment. Differences between the comparative example and the first embodiment will be explained.

According to the piezoelectric actuator 17 of the first embodiment, the wall 48 on the outer side of the opening 21 is separated by the clearance 50 into the front wall 52 and rear wall 54 and the adhesive part 47a is formed between the circumferential side surface 23c and bottom surface 23b of the piezoelectric element 23 and the circumferential edge 41 and bottom receiver 43 of the opening 21.

On the other hand, according to the piezoelectric actuator 61 of the comparative example, there is no wall on the outer side of the opening 21. This configuration is weak in bearing the piezoelectric element 23 on the outer side of the opening 21.

According to the piezoelectric actuator 61 of the comparative example, the nonconductive adhesive 47 is applied only along front and rear sides between the circumferential side surface 23c of the piezoelectric element 23 and the circumferential edge 41 of the opening 21.

The three tests to evaluate stiffness of the piezoelectric actuators of the comparative example and first embodiment will be explained.

FIGS. 5A, 5B, and 5C illustrate the directions and sizes of load applied in the tests, in which FIG. 5(A) is a vertical stiffness test, FIG. 5(B) is a torsional stiffness test, and FIG. 5(C) is a sway stiffness test. FIG. 6 is a table illustrating results of the tests conducted on the comparative example and first embodiment.

The test of FIG. 5(A) evaluates vertical stiffness. This test upwardly applies a vertical load of 1 gf to a widthwise center at a front end of the actuator base 18 as illustrated with an arrow in FIG. 5(A) and measures a stiffness correlation value of the piezoelectric actuator 17 with a tester.

The test of FIG. 5(B) evaluates torsional stiffness. This test upwardly and downwardly applies a torsional load of 0.5 gf to each widthwise edge of the front end of the actuator base 18 as indicated with arrows in FIG. 5(B) and measures a stiffness correlation value of the piezoelectric actuator 17 with a tester.

The test of FIG. 5(C) evaluates sway stiffness. This test applies a load of 1 gf in a sway direction to the front end of the load beam 15 as indicated with an arrow in FIG. 5(C) and measures a stiffness correlation value of the piezoelectric actuator 17 with a tester.

Results of the tests are illustrated in FIG. 6.

(1) Result of vertical stiffness test

The embodiment 1 demonstrates a vertical stiffness correlation value of 10850 N/m that is 10% or more greater than a vertical stiffness correlation value of 9467 N/m of the comparative example.

(2) Result of torsional stiffness test

The embodiment 1 demonstrates a torsional stiffness correlation value of 1243 µNm/deg that is about 25% greater than a torsional stiffness correlation value of 942 µNm/deg of the comparative example.

(3) Result of sway stiffness test

The embodiment 1 demonstrates a sway stiffness correlation value of 47342 N/m that is 20% or more greater than a sway stiffness correlation value of 37560 N/M of the comparative example.

From the test results, it is understood that the piezoelectric actuator 17 of the first embodiment demonstrates 10% or higher stiffness correlation values than the piezoelectric actuator 61 of the comparative example.

As explained above, the head suspension 11 according to the first embodiment has the circumferential side surface 23c of the piezoelectric element 23, the circumferential edge 41 of the actuator base 18 that defines the opening 21, surrounds the piezoelectric element 23, and faces the circumferential side surface 23c, the bottom receiver 43 that is arranged at the opening 21 and faces the periphery of the bottom surface 23b of the piezoelectric element 23, the clearance 50 that is formed on the outer side of the opening 21, splits the circumferential edge 41 and bottom receiver 43, and allows the piezoelectric element 23 to deform, and the nonconductive adhesive part 47a that is formed at least between the circumferential edge 41 of the opening 21 and the circumferential side surface 23c of the piezoelectric element 23 and between the bottom receiver 43 of the opening 21 and the bottom surface 23b of the piezoelectric element 23 and joins the piezoelectric element 23 and opening 21 together.

According to the first embodiment, the opening 21 and piezoelectric element 23 are substantially circumferentially joined together with the nonconductive adhesive part 47a, so that the opening 21, adhesive part 47a, and piezoelectric element 23 function as an integrated support beam to improve stiffness of the piezoelectric actuator 17.

According to the first embodiment, the nonconductive adhesive part 47a is also formed at the clearance 50, to entirely surround the circumference of the piezoelectric element 23. This further improves the stiffness of the piezoelectric actuator 17.

The first embodiment, therefore, can secure high stiffness of the head suspension 11 without employing a pair of the flexible links of the related art.

According to the first embodiment, the presence of the clearance 50 never blocks a displacement stroke of the piezoelectric actuator 17 in a sway direction.

The head suspension 11 of the first embodiment, therefore, secures basic characteristics such as vibration and impact characteristics without deteriorating the displacement stroke of the actuator 17.

The first embodiment omits the flexible links of the related art, and therefore, can reduce widthwise dimensions of the head suspension 11, increase the number of parts to be taken out of materials, and improve the productivity of head suspensions.

The head suspension according to the first embodiment has substantially the same width as standard head suspensions, and therefore, is manufacturable through an existing manufacturing line. This may reduce facility investment.

Producing the actuator base 18 according to the first embodiment may involve pressing and barreling. In this case, burrs will smoothly be removed from the actuator base 18 because the actuator base 18 has no protruding parts such as the flexible links of the related art. Namely, the first embodiment secures smooth work and reduces manufacturing costs.

When designing a magnetic disk drive in which a head suspension is installed, the head suspension 11 of the first embodiment involves no protruding parts such as the flexible links of the related art, and therefore, there is no need of considering interference with peripheral parts. This increases the degree of freedom in designing an arrangement of peripheral parts around the head suspension 11.

In connection with a vibration characteristic, the head suspension 11 according to the first embodiment has no protruding parts such as the flexible links of the related art, and therefore, there is no need of considering vibration modes that never occur on standard head suspensions. Accordingly, the head suspension of the first embodiment can be designed through substantially the same number of design steps as related arts.

In the head suspension 11 of the first embodiment, the circumferential edge 41 of the opening 21 substantially entirely surrounds the circumferential side surface 23c of the piezoelectric element 23 and the nonconductive adhesive 47 is applied between the circumferential edge 41 and the circumferential side surface 23c, to form the adhesive part 47a. Accordingly, the first embodiment realizes at high level to effectively transmit a distortion (displacement) of the piezoelectric element 23 to the load beam 15, secure electric insulation between the electrode of the piezoelectric element 23 and the actuator base 18, prevent dust from dropping off the circumferential side surface 23c of the piezoelectric element 23, and protect the brittle piezoelectric element 23 from damage.

A head suspension according to the second embodiment of the present invention will be explained.

Figure 7:
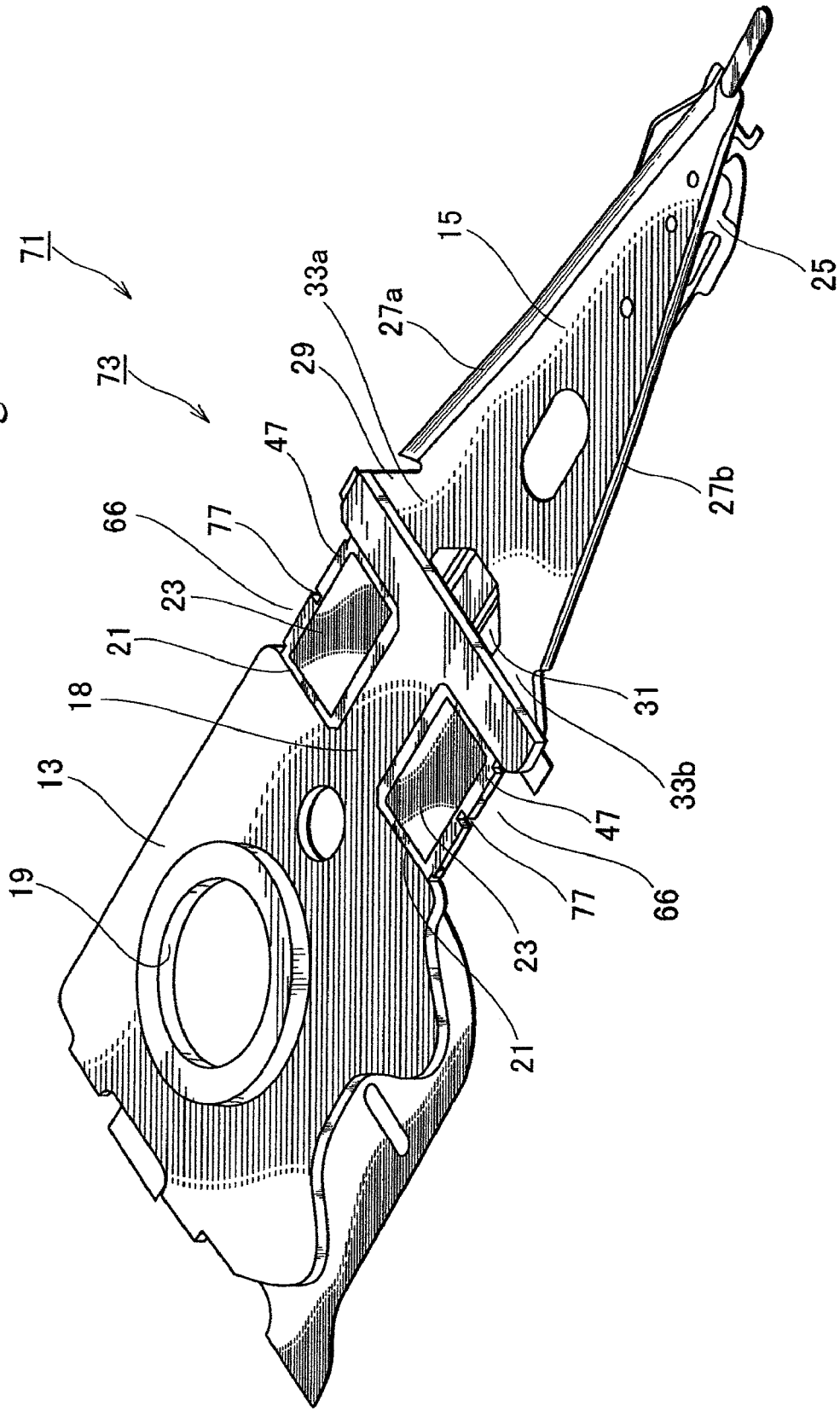
FIG. 7 is a perspective view illustrating a head suspension according to a second embodiment of the present invention.
Figure 8:
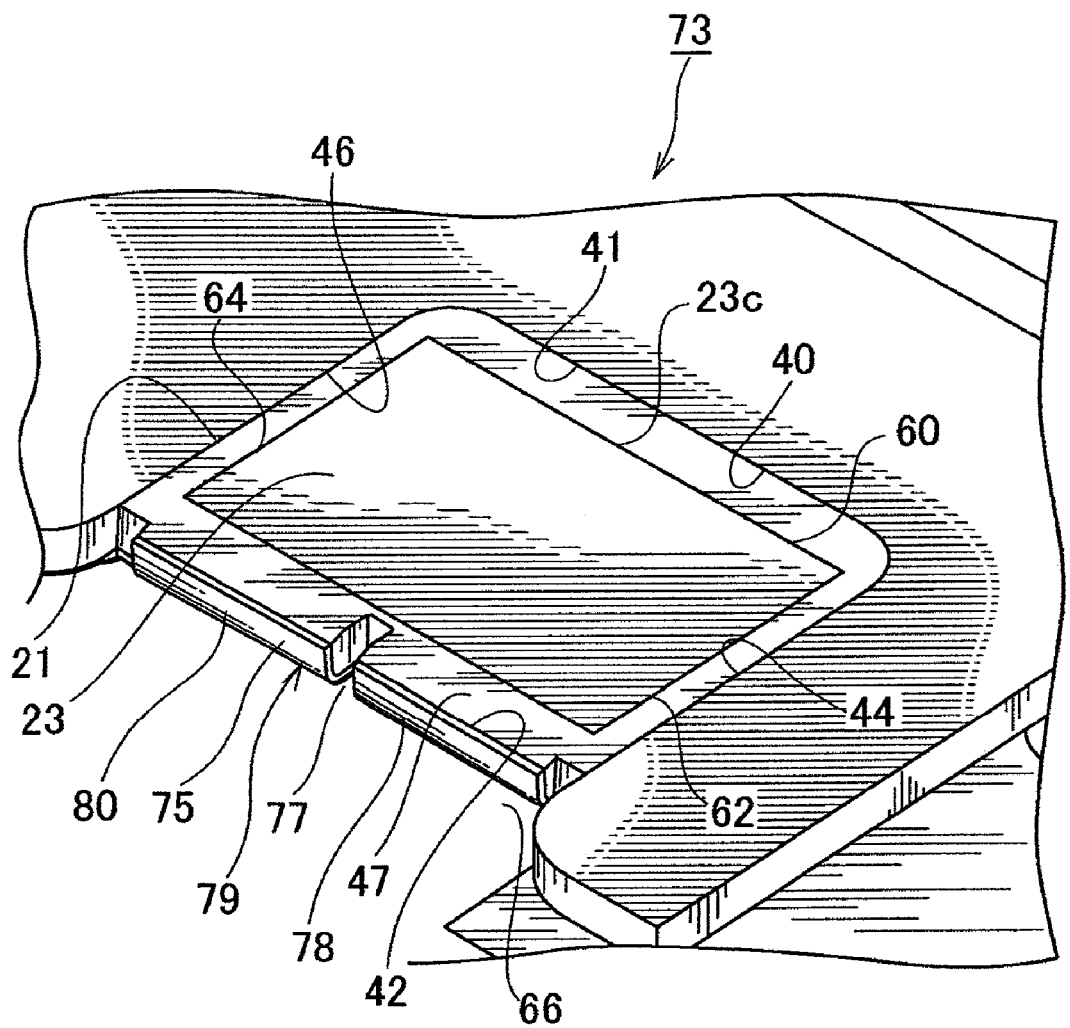
FIG. 8 is an enlarged perspective view illustrating a piezoelectric actuator of the head suspension illustrated in FIG. 7.
Figure 9:
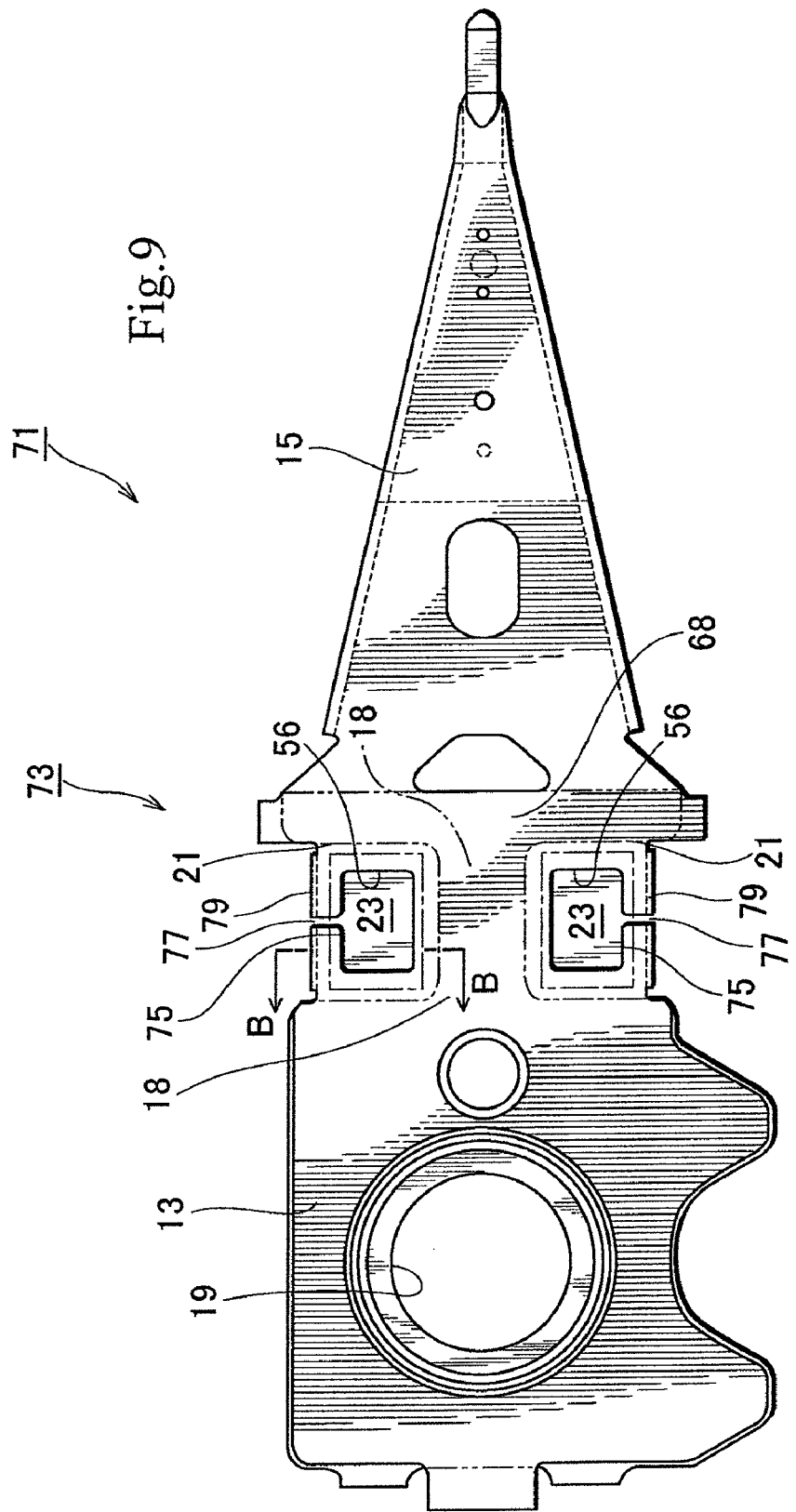
FIG. 9 is a plan view illustrating the head suspension of FIG. 7.
Figure 10:
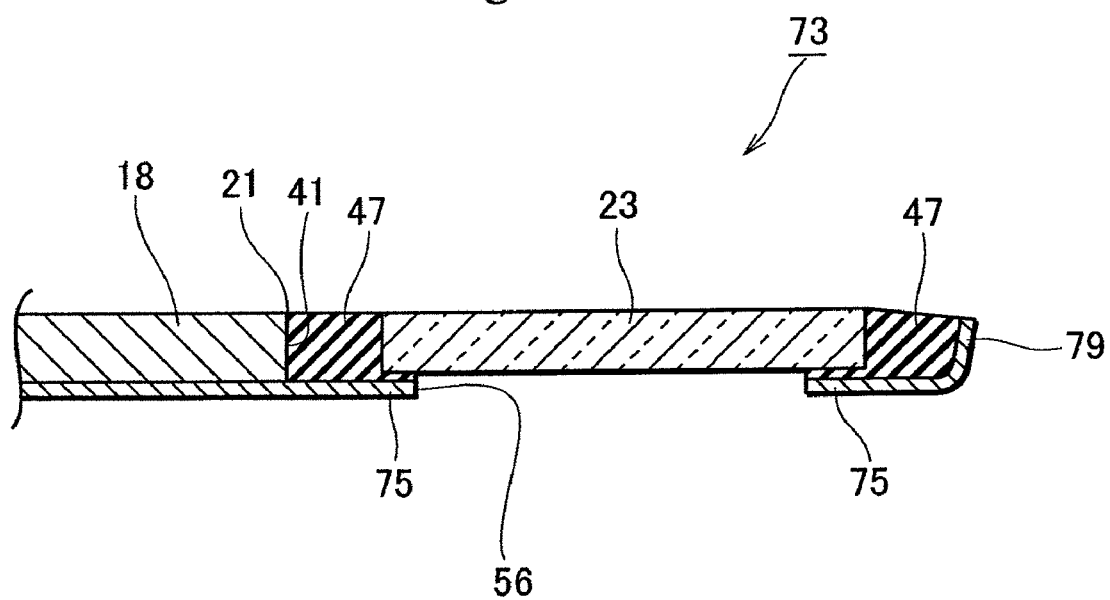
FIG. 10 is a sectional view taken along a line B-B of FIG. 9.

FIG. 7 is a perspective view illustrating the head suspension according to the second embodiment of the present invention, FIG. 8 is an enlarged perspective view illustrating a piezoelectric actuator of the head suspension illustrated in FIG. 7, FIG. 9 is a plan view illustrating the head suspension of FIG. 7, and FIG. 10 is a sectional view taken along a line B-B of FIG. 9.

The head suspension 71 according to the second embodiment is configured basically the same as the head suspension 11 of the first embodiment. In this embodiment, like parts are represented with like reference marks of the first embodiment and differences between the first and second embodiments will mainly be explained.

According to the first embodiment, the actuator base 18 of the piezoelectric actuator 17 is integrally provided with the bottom receiver 43. On the other hand, the head suspension 71 according to the second embodiment joins a separate bottom receiver 75 with an actuator base 18 of a piezoelectric actuator 73.

The second embodiment omits the wall 48 integral with the actuator base 18 of the first embodiment and forms an open section 66 on an outer side of an opening 21.

As illustrated in FIG. 10, the bottom receiver 75 is a part of a metal thin plate member 68 that is separate from the actuator base 18. The plate member 68 is cut from a material plate into a predetermined shape by, for example, pressing. The plate member 68 is laid on a bottom face of the actuator base 18 and is fixed thereto to form a part of the actuator base 18.

The plate member 68 has a communication hole 56, the periphery of the communication hole 56 extends into the opening 21. This extension serves as the bottom receiver 75. The bottom receiver 75 has an integral wall 79.

The wall 79 is formed by bending an outer part of the plate member 68, so that the wall 79 rises in the open section 66. The wall 79 forms a circumferential edge 42 of the opening 21 and receives a nonconductive adhesive 47.

Like the first embodiment, the wall 79 has a clearance 77 that splits the wall 79 into a front wall 78 and a rear wall 80. As a result, the actuator base 18 is cut at the clearance 77 on the outer side of the opening 21.

The clearance 77 extends from an edge of the wall 79 through the bottom receiver 75 of the plate member 68 to the communication hole 56. A size in a lateral direction of the clearance 77 is larger than a size in a longitudinal direction thereof.

The piezoelectric actuator 73 of the head suspension 71 according to the second embodiment is manufacturable without half-etching technique. Namely, the piezoelectric actuator 73 is manufacturable by full-etching a material into the actuator base 18, by pressing a material into the bottom receiver 75, and by joining the actuator base 18 and bottom receiver 75 together.

Accordingly, in addition to the effect of the first embodiment, the second embodiment provides effects of simplifying the manufacturing of the head suspension 71, reducing the number of processes thereof, and improving an assembling accuracy thereof.

A head suspension according to the third embodiment of the present invention will be explained.

Figure 11:
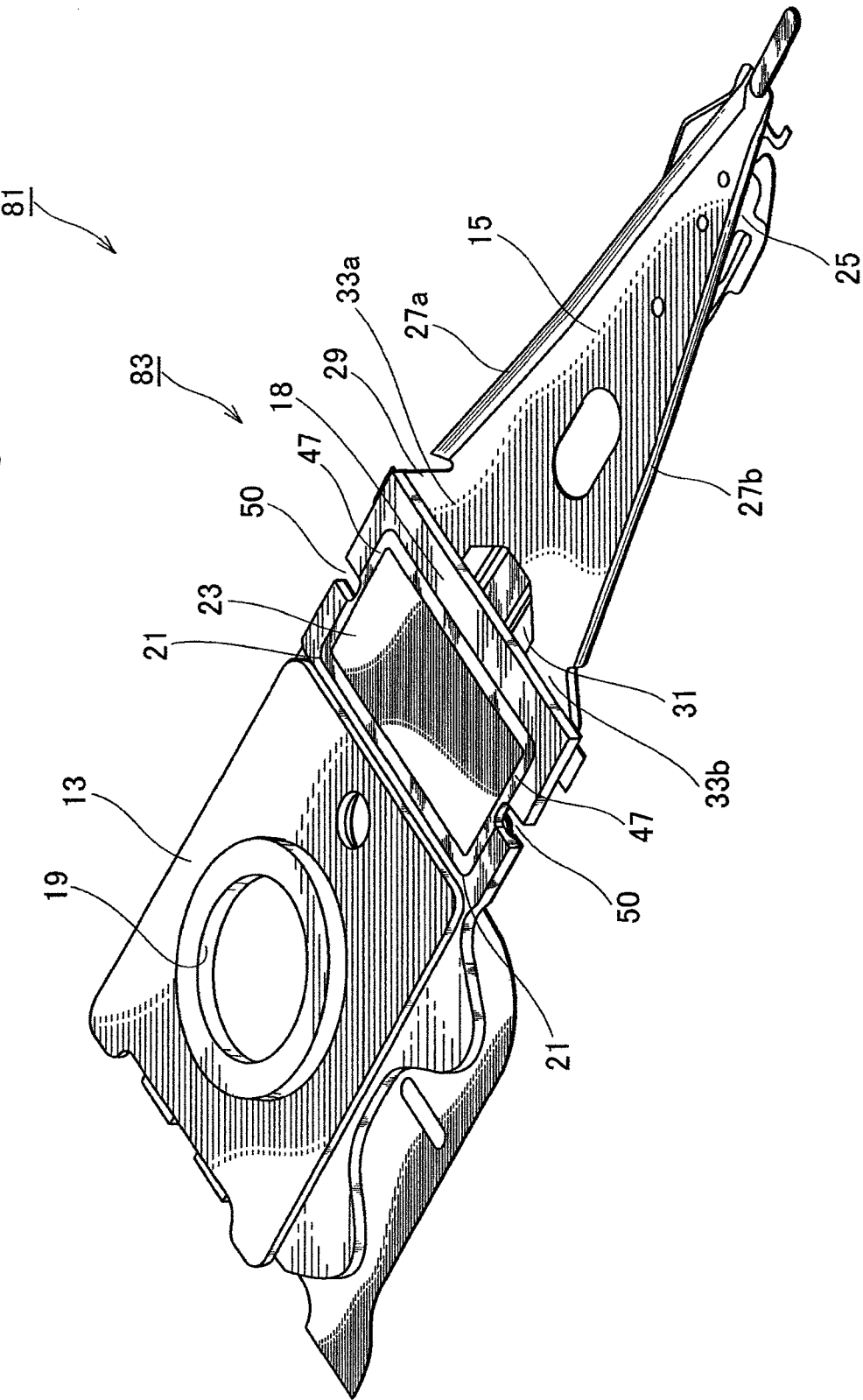
FIG. 11 is a perspective view illustrating a head suspension according to a third embodiment of the present invention.

FIG. 11 is a perspective view illustrating the head suspension 81 according to the third embodiment of the present invention.

The head suspension 81 according to the third embodiment is configured basically the same as the head suspension 11 of the first embodiment. In this embodiment, like parts are represented with like reference marks of the first embodiment and differences between the first and third embodiments will mainly be explained.

According to the first embodiment, the head suspension 11 has a pair of openings 21 formed in the actuator base 18 of the piezoelectric actuator 17 and a pair of piezoelectric elements 23 arranged in the openings 21, respectively.

On the other hand, the head suspension 81 of the third embodiment has a single opening 21 in an actuator base 18 of a piezoelectric actuator 83 and a single piezoelectric element 23 arranged in the opening 21.

In addition to the effect of the first embodiment, the third embodiment provides effects of simplifying assembling work of the head suspension 81, reducing the number of processes thereof, and improving an assembling accuracy thereof.

The present invention is not limited to the embodiments mentioned above and is properly modifiable according to the descriptions of the claims and specification without departing from the scope of the present invention.

For example, the load beam 15 and the actuator base 18 that are separate from each other according to the embodiments may be integral with each other.

The number of the openings 21 of the actuator base 18 and the number of the piezoelectric elements 23 arranged in the openings 21 may each be three or more instead of one or two of the embodiments.

According to the embodiments, the nonconductive adhesive part 47a is continuously formed around the piezoelectric element 23. Instead, the adhesive part 47a surrounding the piezoelectric element 23 may be discontinuous at the clearance 50 (77).

The above-mentioned embodiments are based on an assumption that the head suspension is arranged above a magnetic disk in a magnetic disk drive so as to face the magnetic disk. In practice, the head suspension is also arranged below the magnetic disk so as to face the same. To each case, the present invention is applicable by properly interpreting positional expressions in the embodiments depending on the case.

What is claimed is:

1. A head suspension having a load beam and a piezoelectric actuator, the piezoelectric actuator supporting a base part of the load beam and configured to displace a front end of the load beam in a sway direction, the head suspension comprising:
the piezoelectric actuator having an actuator base and at least a piezoelectric element, the actuator base connected to the base part of the load beam and having at least an opening, the piezoelectric element attached to the opening and deforming in response to a voltage applied thereto to conduct displacement of the front end of the load beam;
a circumferential side face of the piezoelectric element;
a circumferential edge of the opening, configured to define the opening in the actuator base and surround and face the circumferential side face of the piezoelectric element;
a bottom receiver formed at the opening, configured to face the periphery of a bottom face of the piezoelectric element;
a clearance splitting the circumferential edge of the opening and the bottom receiver, configured to allow the piezoelectric element to deform; and
a nonconductive adhesive applied at least between the circumferential edge of the opening and the circumferential side face of the piezoelectric element and between the bottom receiver and the bottom face of the piezoelectric element, configured to adhere the piezoelectric element to the opening.

2. The head suspension of claim 1, wherein the bottom receiver is formed by half-etching the actuator base such that the bottom receiver is integral with the actuator base.

3. The head suspension of claim 1, further comprising:
a thin plate being discrete from the actuator base and fixed to a bottom face of the actuator base to form the bottom receiver.

4. The head suspension of claim 3, wherein:
a wall formed from the thin plate on an outer side of the opening such that the wall forms a part of the circumferential edge of the opening; and
the clearance being formed to split the wall.

5. The head suspension of claim 1, further comprising:
a wall integrally formed from the actuator base on an outer side of the opening such that the wall forms a part of the circumferential edge of the opening; and
the clearance being formed to split the wall.

6. The head suspension of claim 1, wherein the opposing faces of the piezoelectric element and opening are entirely covered with the adhesive.

7. The head suspension of claim 1, wherein the clearance is a cut whose dimension in the sway direction is larger than a dimension thereof in a direction across the sway direction.

8. The head suspension of claim 1, wherein the clearance splits the circumferential edge of the opening by a very small distance at an approximately central part of an outer side of the opening.

9. The head suspension of claim 1, wherein the actuator base has two openings formed side by side in the sway direction, and
the piezoelectric actuator has two piezoelectric elements arranged in the openings, respectively.

10. The head suspension of claim 1, wherein a center axis of the actuator base in a thickness direction aligns with a center axis of the piezoelectric element in the thickness direction.

* * * * *